United States Patent [19]

Balough

[11] Patent Number: 5,423,641

[45] Date of Patent: Jun. 13, 1995

[54] METHOD AND APPARATUS FOR ALIGNING PUNCH AND DIE BLOCKS OR RETAINERS

[76] Inventor: Floyd Balough, 1150 W. Olive Ave., Burbank, Calif. 91506

[21] Appl. No.: 83,012

[22] Filed: Jun. 24, 1993

[51] Int. Cl.⁶ ............................................. B23B 49/00
[52] U.S. Cl. ..................................... 408/241 R; 408/3
[58] Field of Search ............. 408/3, 75, 115 R, 241 R; 33/474, 452, 464, 812; 29/464, 465

[56] References Cited

U.S. PATENT DOCUMENTS 2,497,733  2/1950  Kebour ........................... 408/115 R

FOREIGN PATENT DOCUMENTS 433314   4/1948  Italy ................................ 408/115 R
796057   6/1958  United Kingdom ............ 408/115 R
1618519  1/1991  U.S.S.R. ......................... 408/115 R

*Primary Examiner*—Daniel W. Howell

[57] ABSTRACT

A method and apparatus for aligning punch and die blocks or retainers in order to bore dowel-receiving and screw-receiving holes in shoes of die sets.

2 Claims, 6 Drawing Sheets

METHOD AND APPARATUS FOR ALIGNING PUNCH AND DIE BLOCKS OR RETAINERS

FIELD OF INVENTION

This invention relates to the method and apparatus used to align and affix punch and die blocks or punch and die button retainers to the shoe of die sets, using the centerlines of the guide posts and guide bushings of the die set itself for reference purposes.

BACKGROUND OF THE INVENTION

Dies are used in the prior art to shape, form, draw and notch metal or other suitable material and these prior prior art dies are generally affixed to a die set which is a two-piece devise that is in turn attached to a punch press. The die set typically consists of a steel top plate and a steel bottom plate aligned with one another by means of guide posts and bushings permitting vertical movement of the top plate relative to the bottom plate but preventing relative lateral movement therebetween. The die set includes a bottom die shoe containing guide posts and a top punch shoe containing guide bushings. The punch holder or top punch shoe is affixed to the punch press ram and the die holder or bottom die shoe is affixed to the bolster plate of the press.

Useful work is accomplished with die sets by bolting and dowel pinning various tools e.g., punch blocks or punch retainers and die blocks or die button retainers to both the bottom and top shoes of die sets. Normally, die blocks or die button retainers are aligned on the bottom shoe first. This is usually accomplished by affixing a straight edge or parallel to the edges of the guide pins on the bottom shoe and then placing a square against the straight edge or parallel and one of the guide posts establishing both parallel and perpendicular reference planes. After the reference planes have been established, placing gage blocks against the straight edge and the square provides rectangular coordinates corresponding to the edges of the guide posts. Die blocks to be mounted are placed against the gage blocks and transfer punches are used to transfer the bolt hole pattern to the bottom shoe. Using those punch marks the bottom shoe is drilled and tapped for mounting bolts.

Although the setting of the die blocks or die button retainers is a relatively easy procedure its main disadvantage is that its difficult to affix the straight edge, position the square, gage blocks and die blocks or die button retainers in such a manner as to insure that nothing has moved. My invention greatly reduces the possibility of misalignment and it is a faster and easier method and apparatus to use than prior art procedures.

The real problems in die assembly arise when trying to align punch block or punch retainers to correspond with the die blocks. This procedure in the past has proved to be extremely difficult and time consuming. My invention provides a novel structural arrangement and a novel method of aligning punch and die tooling to overcome the objections of the prior art procedures.

In the past, the prior art teaches us that it was a common practice to reach into the die set and align the punch blocks or the punch retainers with the die blocks then insert a scribing tool into the screw-receiving openings in the punch blocks and scribe circles on the under surface of the punch. The top shoe or punch shoe was then removed and mounting holes drilled and tapped. A great improvement over this method of mounting punch blocks or punch retainers was attained in the Whistler Patent U.S. Pat. No. 3,126,776, whereby e spotting and transfer means was used to provide visible markings on the other shoe for drilling, tapping and mounting of punch retainers. Magnetic inserts have been tried for positioning purposes as was taught and claimed in U.S. Pat. Nos. 3,089,376, and 3,782,166. Adhesives have been used for mounting purposes as was taught and claimed in U.S. Pat. No. 3,504,576. And, fixtures or tooling plates have been used to secure punch and die retainers as taught and claimed in U.S. Pat. Nos. 4,359,915 and 2,504,642.

All previous methods and apparatuses used for mounting punch and die button retainers are deficient in that in order to transfer bolt hole patterns from the, punch retainers to the die shoe, either it was necessary to have the top and bottom shoes assembled together or an individual fixture machined for different dies.

OBJECTS OF THE INVENTION

It is therefore, the principle objects of my invention to provide a new and novel method and apparatus for mounting die blocks or die button retainers to the bottom shoe or die shoe of die sets.

Another object of my invention is to provide a new and novel method and apparatus for locating and mounting punch blocks or punch retainers on the top shoe or punch shoes of die sets, without the necessity of having the top shoe and bottom shoe assembled together, or having to machine individual fixtures or plates for every individual die.

It is also an object of my invention to provide a comparatively low cost method and apparatus for locating and mounting tooling blocks on die shoes, one that is reliable, faster and easier to use than existing methods and apparatuses.

SUMMARY OF THE INVENTION

These objectives and others which will become apparent hereinafter are attained, in accordance with my invention by providing means for establishing both parallel and perpendicular reference surfaces that correspond with the centerlines of both the guide posts of bottom die shoes and the guide bushings of the top punch shoes of die sets, and means for holding, locating, and transferring bolt hole patterns from both punch retainers and die retainers to die shoes.

Specifically, therefore, the adjustable apparatus for aligning punch and die blocks and punch and die button retainers, can comprise but is not limited to:

A rail;
means on said rail for keying and affixing attachments thereto;
a compound stationary V-block and perpendicular reference arm;
means on said compound stationary V-block and perpendicular reference arm providing for nesting of the guide posts of die sets;
means on said compound stationary V-block and perpendicular reference arm providing permanent fastening to said rail;
means on said compound stationary V-block,and perpendicular reference arm providing for affixing attachments thereto;
a perpendicular reference plate;
means on said reference plate providing variable positioning in relationship to said compound stationary V-block and perpendicular reference arm;

spacers;
means on said spacers providing for mounting between the said compound stationary V-block and perpendicular reference arm, and the said reference plate;
a movable V-block;
means on said movable V-block providing for nesting the surfaces of cylindrical objects;
means on said movable V-block providing variable positioning along length of said rail;
means on said movable V-block providing compound force vectors between said movable V-block and said rail;
a compound T-nut;
means on said compound T-nut providing variable positioning along length of said rail;
means on said compound T-nut providing compound force vectors between it, said movable V-block, and said rail;
centerline reference blocks;
means on said centerline reference blocks providing variable positioning along length of said rail;
T-nuts;
means on said T-nuts providing variable positioning along length of said rail;
a locating pin;
means on one end of said locating pin providing for indexable positioning;
means on opposite end of said locating pin providing cooperating with punch and die button body-receiving holes of retainers;
a locating pin holder;
means on said locating pin holder providing for receiving the indexable positioning end of said locating pin.

In the construction of the prototype of the invention, a central rail was machined with a T-slot running it's length. The purpose of the T-slot was to provide a means by which a stationary V-block and perpendicular reference arm could be permanently keyed and fastened to it. The T-slot also provides a means by which one or more centerline reference blocks and a movable V-block could be temporarily locked into position anywhere along the length of the rail.

Beginning with the rail, the Compound stationary V-block and the perpendicular reference arm were permanently bolted together. The compound stationary V-block and the perpendicular reference arm provide a nesting surface for guide posts, and the arm part provides a surface for drilling and counterboring a multiplicity of holes by which spacers and the reference plate could be temporarily bolted to it. The multiplicity and spacing of the holes provides additional means whereby the reference plate can be extended to clear the bushings of punch shoes or simply extended horizontally for increased working area.

In combination, the compound stationary V-block and perpendicular reference arm, spacers and the reference plate provides means by which the reference plate can be placed perpendicular to and on the exact centerline of one of the guide posts that have been nested in the V-block portion of the compound stationary V-block and perpendicular reference arm. The novelty and versatility of the combination can be further enhanced by varying the thickness of the spacers and by machining the V-block portion of the compound stationary V-block and the perpendicular reference arm to nest larger diameter guide pins, because then the reference plate could be brought to the exact centerlines of both large and small diameter guide posts by simply using spacers of the proper thickness. In addition, the reference plate can be offset to the centerlines of guide posts by either varying the thickness of the spacers or by positioning the spacers and the reference plate to the other side of the arm portion of the compound stationary V-block and the perpendicular reference arm, while still maintaining perpendicularity to said rail.

The centerline reference blocks were machined to correspond to the exact centerline of the guide posts. Attached to the rail, they provide a parallel reference surface to the guide posts. The centerline reference blocks can be temporarily fastened at any position along the length of the rail by means of counterbored holes, bolts, and T-nuts. In addition to this capacity, the centerline reference blocks can be offset to the centerlines of guide posts by simply reducing their thickness while still maintaining parallelism to said rail.

The invention is assembled by permanently bolting the compound stationary V-block and perpendicular reference arm to the rail. Bolts are used in the counterbored holes of the perpendicular reference arm portion to bolt the reference plate either close to a guide post on the die shoe or extended horizontally along the arm portion to clear the guide bushing of the punch shoes. Spacers are used between the reference plate and the compound stationary V-block and perpendicular reference arm, to either position the surface of the reference plate to the centerlines or offset it from the centerlines of guide posts or guide bushings of die shoes. The centerline reference blocks are affixed to the rail by placing a bolt through its counterbored hole and into the T-nuts, placing the centerline reference block and T-nut assembly in the T-slot of the rail, moving the centerline reference block to the desired position and locking it in place by the bolt. The movable V-block is mounted to the rail by passing a bolt through it into the angularly drilled and tapped hole in the compound T-nut, this assembly can also be placed into the T-slot on the rail, positioned anywhere along the rail and locked into place by tightening its' bolt.

After the invention has been assembled it will be affixed on the guide posts of die shoes or mounted to guide posts that have been placed into the bushings of the punch shoe. As an example of the inventions use I will explain the mounting of a die button retainer on the bottom shoe or die shoe:

Place 1-2-3 blocks or riser blocks between the posts of the die shoe and position them so they provide a resting surface for the rail. Position reference plate on the compound stationary V-block and the perpendicular reference arm so that it is close to the sides of the guide posts. Take the parallel and perpendicular reference rail assembly portion of the invention and place the rail on top of the 1-2-3 blocks or riser blocks in such a manner that the stationary V-block nests the side of one of the guide posts. While applying downward pressure on the rail slide the movable V-block and compound T-nut assembly down the rail until the movable V-block nests against the surface of the other guide post. Lock the compound T-nut to the bottom of the T-slot on the rail using the set screw provided on one end of the compound T-nut. Tighten the bolt on the movable V-block.

Because the compound T-nut is locked to the rail, and its other bolt hole is on an angle any pressure applied while tightening the bolt on the movable V-block produces compound force vectors that force the movable V-block against both the rail and the edges of guide post. Because of the inherent properties of V's to self center and self square, the forces generated by tightening the bolt on the movable V-block is more than sufficient to resist any accidental movement, and it also lends itself to a high degree of locational repeatability. Locking the invention to the rail establishes a parallel reference edge upon which the centerline reference block or blocks are bolted. The centerline reference blocks extend from the rail, which is above the surface of the die shoe, to just above the working surface of the die shoe. The reference plate is then positioned close to the die shoe and the reference plate itself extends downwards to just above the surface of the die shoe. Because the edges of both the centerline reference block and the reference plate are on the centerline of the guide post, both parallel and perpendicular reference surfaces are established.

Placing gage blocks of predetermined dimensions against these parallel and perpendicular reference surfaces establishes a rectangular coordinate by which the edges of the die block can be positioned for transfer of bolt hole locations to the shoe.

Because punch retainers and die button retainers are typically rough machined or cast to size the only exacting dimension is that portion which actually holds the punch or die button. My invention includes a new and useful locating pin and locating pin holder providing means by which die retainers and punch retainers can be accurately positioned and mounted on die shoes. When used in conjunction with the parallel and perpendicular rail assembly described above, the positioning and mounting of die retainers and punch retainers can be accomplished without the necessity of having the die shoe and punch shoe assembled together or without the necessity of machining a fixture plate to locate the punch and die retainers.

The prototype locating pin was constructed with a ball-lock seat on one end that would fit into the body-receiving hole of punch and die button retainers. The other end of the locating pin was machined so as to be synchronized or keyed to the ball-lock seat. The octagon shape on one end of the locating pin provides a means by which punch and die retainers can be positioned at increments of 45 degree angles.

The locating pin holder comprises a body with a protruding tang high enough to clear the body of punch and die retainers and long enough to allow the punch or die retainers to be rotated to varying positions. A octagon shaped hole was machined into the end of the tang providing a means to receive the locating pin.

To use this part of my invention place the ball-lock end of the locating pin into the body-receiving hole of either a punch retainer or die button retainer, and lock in place. Slip the octagon shaped end of locating pin into the octagon shaped hole in the locating pin holder.

This assembly can now be positioned on the die shoe by placing the edges of the locating pin holder against the surfaces of gage blocks that have been placed against the parallel and perpendicular reference surfaces of the rail assembly. This provides a mathematical rectangular coordinate that can be calculated from the centerlines of guide posts to the centerline of the locating pin. At this point the bolt hole pattern of the die button retainer is transferred from the retainer to the surface of the punch or die shoes by means of a transfer punch, which leaves punch marks on its surface. The die shoe is then taken to a drill press where the mounting bolt holes are drilled and tapped using the punch marks on the die shoe surface for location. After drilling and tapping the mounting holes the die button retainer is repositioned, as explained above, and the mounting bolts securely tightened. Dowel pin holes are then drilled and reamed into the die shoe, using the dowel pin holes in the retainer itself as guides, dowels are inserted into these dowel pin holes which sets the die button retainer in its final position upon the face of the die shoe.

The parallel and perpendicular reference rail assembly portion of my invention can be used by itself to position and affix punch and die blocks to the shoes of die sets by their referenced edges. In addition, the capabilities of my invention is further enhanced when used in conjunction with the locating pin holder assembly because then punch and die button retainers, with a referenced body-receiving hole, can be positioned and affixed to the shoes of die sets by using the edges of the locating pin holder along with the parallel and perpendicular reference surfaces of the rail assembly to establish an exact rectangular reference coordinate that corresponds with both the centerlines of the guide posts or guide bushings, and the centers of the body-receiving holes on punch and die button retainers.

Another advantage of using the locating pin holder assembly to locate and mount punch and die retainers is that the ball-lock end of the locating pin can set any retainer with the same size body-receiving hole. It makes no difference if the retainer is for punches or die buttons, nor does it make a difference as to what shape of punch or die button will be ultimately used in the retainer, as long as the cross section of the punch or die button is referenced to the center of the body-receiving hole in the retainer being used.

DETAILED DESCRIPTION OF THE INVENTION

Figure 1:
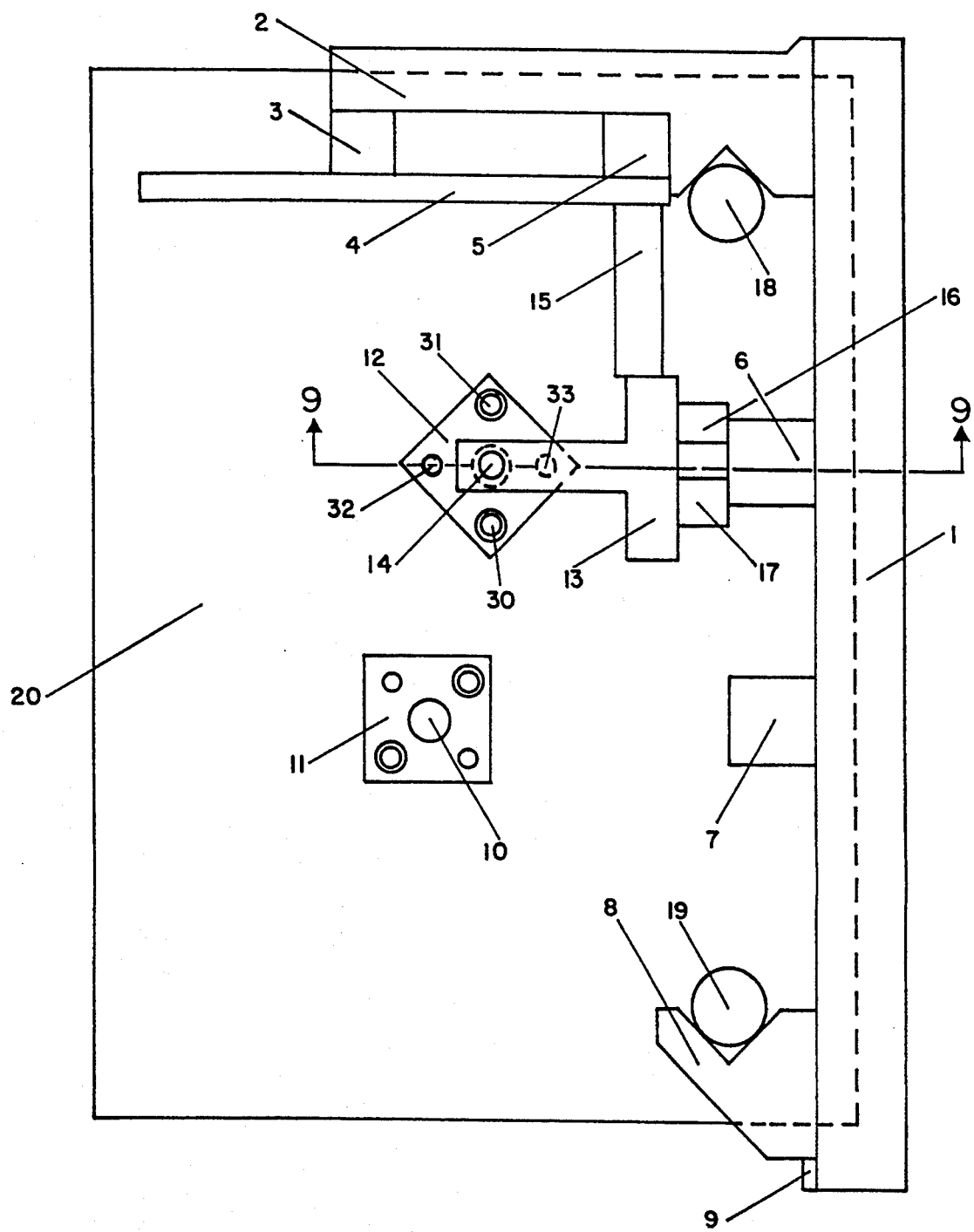
FIG. 1 is a top plan view of the parallel and perpendicular rail assembly portion of the invention, nested and locked into position on the guide posts of a die shoe, it further shows the locating pin and the locating pin holder assembly portion of the invention positioning a die button retainer at a 45 degree angle to the guide post of the die shoe.
Figure 4:
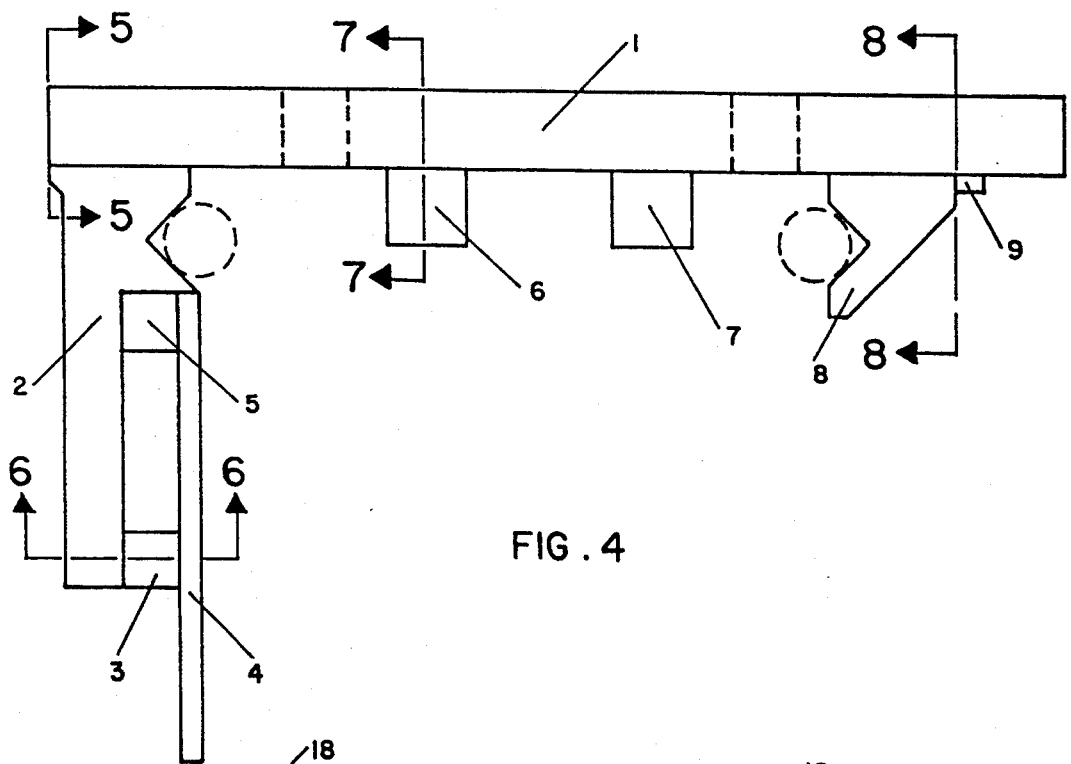
FIG. 4 is also a top plan view of the parallel and perpendicular reference rail assembly portion of my invention, it shows that the movable V-block has been moved closer together, nesting the phantom outline of a set of guide posts, it further shows the invisible outline of riser blocks whose position has also been projected downward to the front view of FIG. 2.

Referring now to the drawings wherein like reference characters designate corresponding parts throughout the several views, there is shown in FIG. 1 a conventional die shoe indicated generally by reference numeral 20 from which extended upwardly conventional guide posts 18 and 19.

In carrying out the method of the present invention, it should be understood that either the die retainer may be first placed on the die shoe and then the punch retainer aligned therewith, or the punch retainer may be first mounted on the punch shoe and then the die retainer aligned therewith. For the purpose of the present invention, the most common method will be described wherein the die retainer is first fixed in position on the die shoe and the punch retainer aligned therewith. The first step of the method is to assemble the parallel and perpendicular reference rail assembly portion of my invention, which is shown in FIG. 1. FIGS. 2,3,4 and 5 show that the parallel and perpendicular reference rail assembly comprises a rail 1 which has a compound stationary V-block and perpendicular reference arm 2 that is keyed and permanently bolted to it. FIGS. 2, 3, 4 and 6 show that the reference plate 4 is affixed to the compound stationary V-block and perpendicular reference arm 2 by bolts passing through spacers 3 and 5. FIGS. 2,3,4 and 7 show the center line reference blocks 6 and 7 are positioned and affixed to the rail 1 by bolts and T-nuts 21 and 22. FIGS. 2,3,4 and 8 show that the movable V-block 8 is also affixed to the rail 1 by a bolt and compound T-nut 9.

Figure 2:
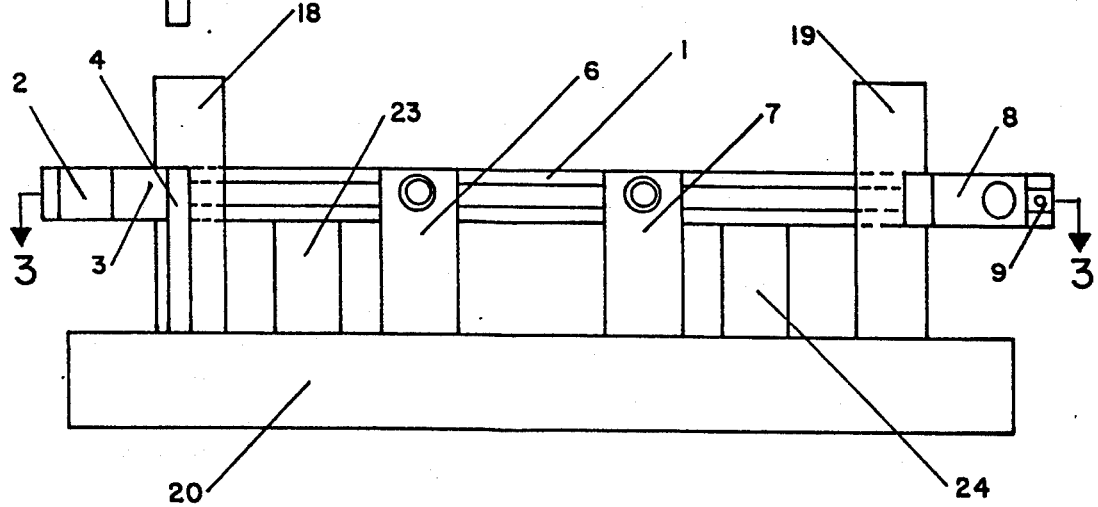
FIG. 2 is a front view of the parallel and perpendicular reference rail assembly portion of my invention nested on the guide posts of a die shoe, it further shows the main rail of this assembly resting atop of riser blocks or 1-2-3 blocks that have been placed between the rail assembly and the top of the die shoe.
Figure 3:
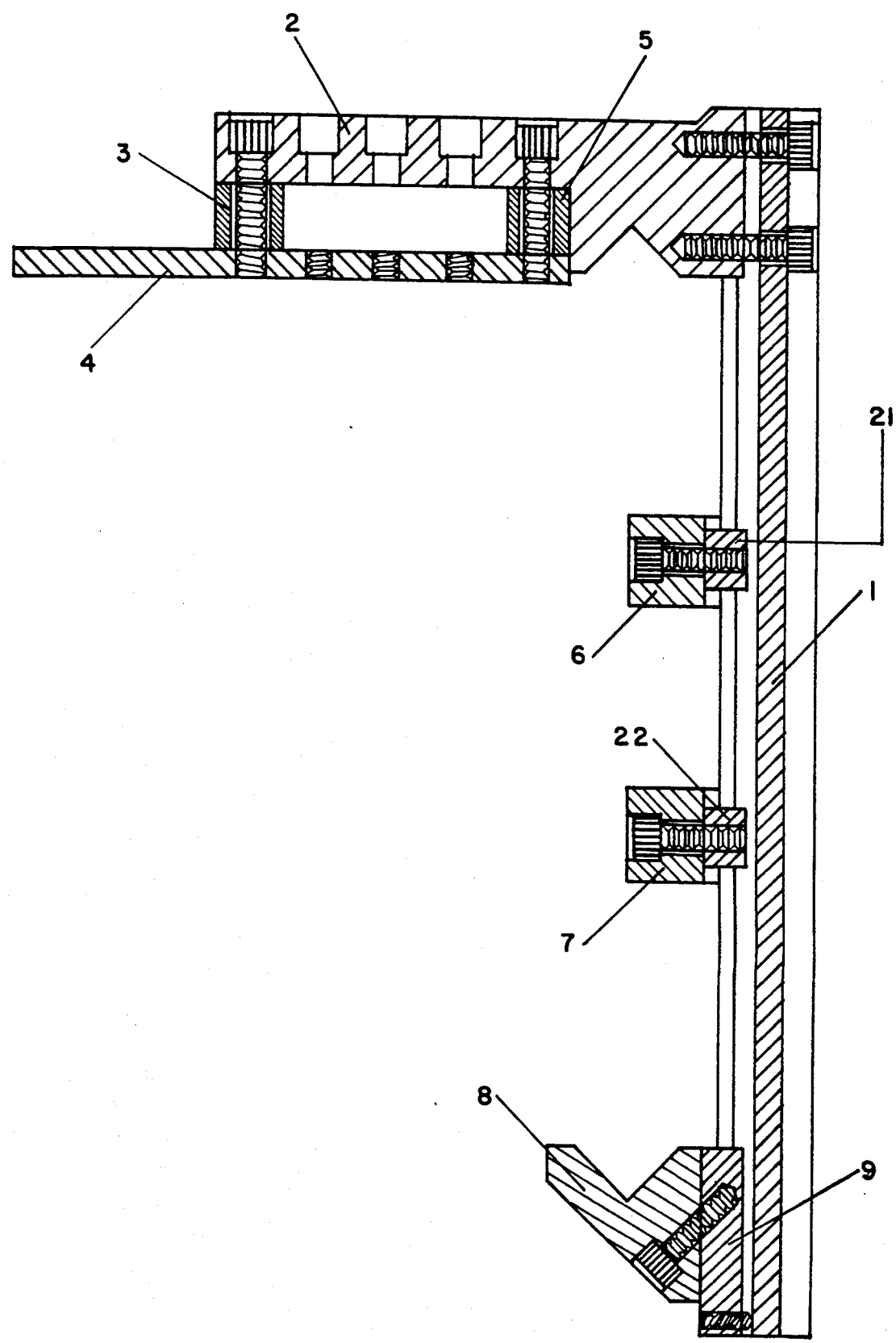
FIG. 3 is a Sectional view taken substantially along the line 3—3 of FIG. 2 looking in the direction of the arrows, it shows the construction of the parallel and perpendicular reference rail assembly portion of my invention, the die shoe and guide posts have been eliminated for clarity.
Figure 5:
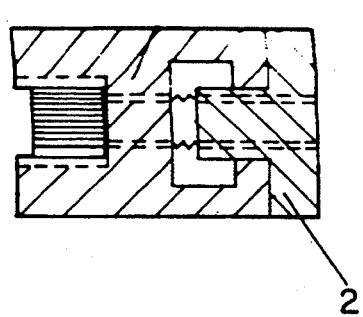
FIG. 5 is a sectional view taken substantially along line 5—5 of FIG. 4 looking in the direction of the arrows, the view has been enlarged and rotated to provide operational clarity.
Figure 6:
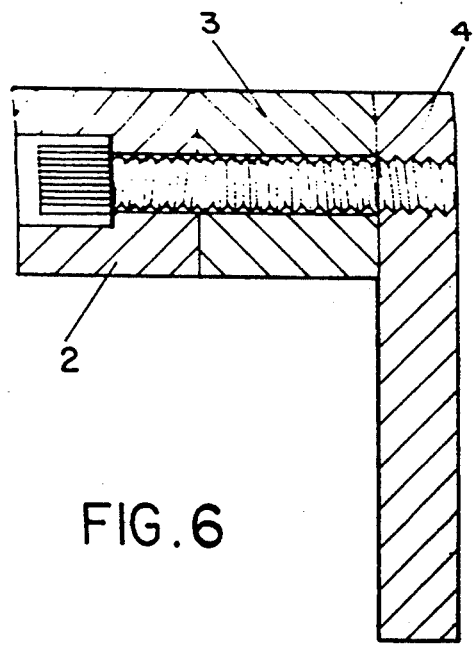
FIG. 6 is a sectional view taken substantially along line 6—6 of FIG. 4 looking in the direction of the arrows, the view has been enlarged and rotated to provide operational clarity.
Figure 7:
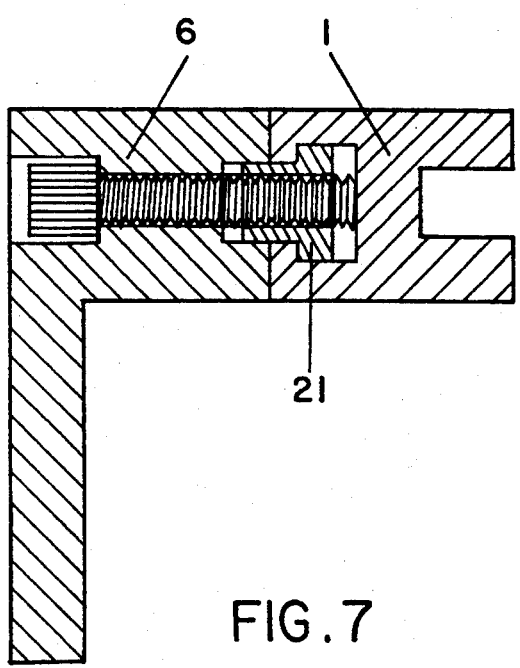
FIG. 7 is a sectional view taken substantially along line 7—7 of FIG. 4 looking in the direction of the arrows, the view has been enlarged and rotated to provide operational clarity.
Figure 8:
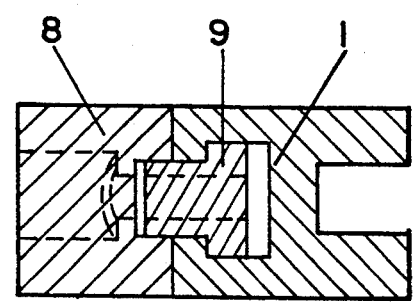
FIG. 8 is a sectional view taken substantially along line 8—8 of FIG. 4 looking in the direction of the arrows, the view has been enlarged and rotated to provide operational clarity.

As seen in FIG. 1, the next step of the method disclosed herein is to place the parallel and perpendicular reference rail assembly portion of my invention FIG. 3 in such a manner that the rail 1 is sitting atop riser blocks 23 and 24 which have been disposed upon the top surface of die shoe 20, as illustrated in FIG. 2. Once the rail 1 is resting on the riser blocks 23 and 24 apply downward pressure with one hand while moving the V-block portion of the compound stationary V-block and perpendicular reference rail 2 so as to nest it with the edges of the guide post 18, as illustrated in FIG. 1 and FIG. 2. While still applying downward pressure on rail 1 slide the movable V-block 8 down rail 1 until its V nests against the edges of guide post 19. At this position, and still applying downward pressure on rail, tighten the set screw on the compound T-nut 9, as illustrated in FIGS. 1,2,3 and 8 so that the compound T-nut 9 is temporarily locked to the bottom of the T-slot on rail 1, as illustrated in FIGS. 3 and 8. Still applying downward pressure on rail 1 tighten the bolt that is running on an angle through the movable V-block 8, as illustrated in FIGS. 3 and 8.

This tightening of the bolt that is running on an angle through the movable V-block 8 creates a compound force vector system because it is opposed by the compound T-nut 9 which has been locked to the bottom of the T-slot on rail 1. Consequently any force applied to the bolt on the movable V-block 8 has the compound effect of pulling the movable V-block 8 against both the rail 1 and the guide post 19. This action securely locks the parallel and perpendicular reference rail assembly portion of my invention FIG. 3 to the guide posts of the die set.

After the parallel and perpendicular reference rail assembly FIG. 3 has been attached to the guide posts 18 and 19 the locating pin 14 and locating pin holder 13, illustrated in FIG. 1, must be assembled and made ready for use in conjunction therewith.

Figure 9:
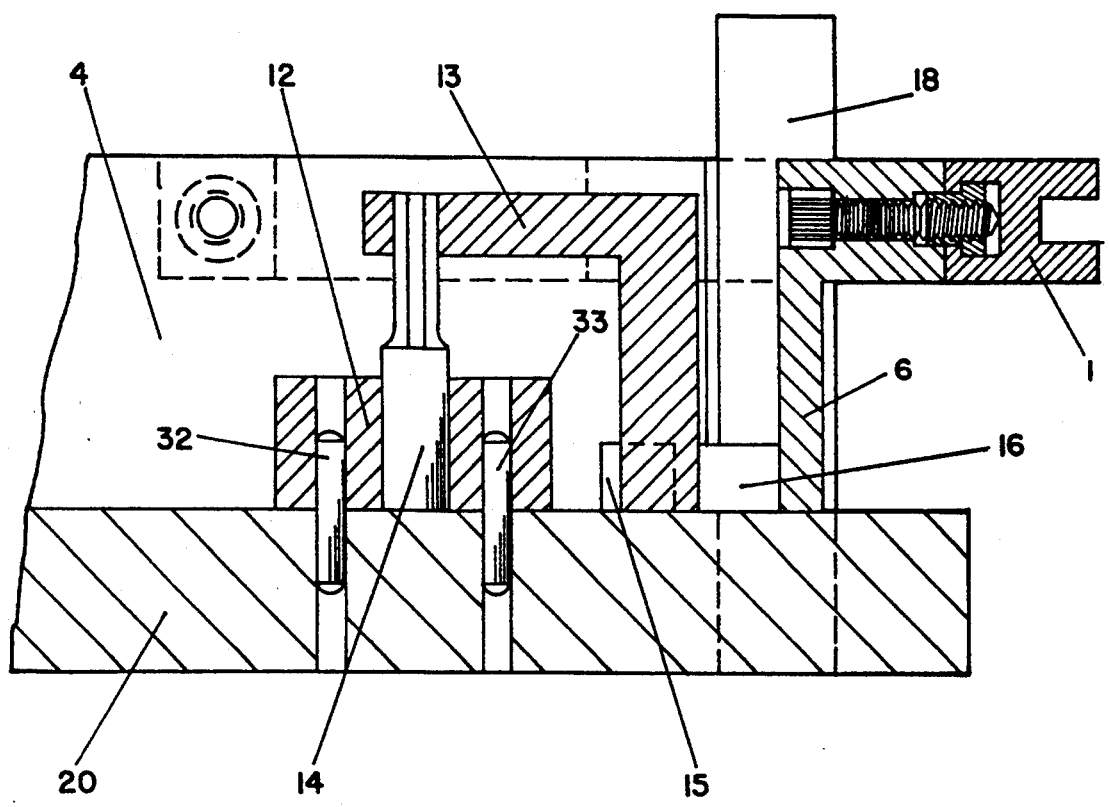
FIG. 9 is a sectional view taken substantially along line 9—9 of FIG. 1 looking in the direction of the arrows, it shows that the die button retainer has been positioned and dowel pinned to the die shoe and that its location was derived from a locating pin placed into it and a locating pin holder, whose edges were placed against gages blocks, that were in turn placed against the parallel and perpendicular reference surfaces of the parallel and perpendicular reference rail assembly portion of my invention, it further shows the spacers and the arm portion of the compound stationary V-block and perpendicular reference arm in hidden lines, hidden lines passing through one gage block have been eliminated for clarity.
Figure 10:
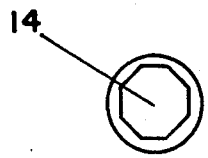
FIG. 10 is an enlarged top plan view of the locating pin.

Referring to FIGS. 9, 10, 11, and 12 the locating pin 14 has cylindrical body with a ball-lock seat machined on one end and an octagon shape on the other end. FIGS. 1 and 9 show a locating pin holder 13 having a rectangular body with a tang protruding from it, that the tang has an octagon shaped hole machined into one end of it, that the tang is high enough to clear the body of the die button retainer 12 and that it is also long enough to reach to the center of the die button receiving hole of a die button retainer 12 that has been rotated about the axis of its die button receiving hole.

Figure 11:
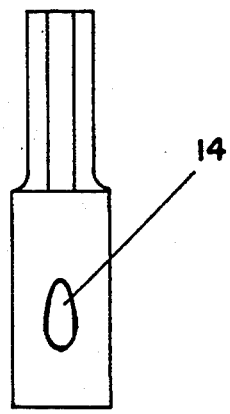
FIG. 11 is an enlarged front view of the locating pin, it shows that the ball-lock seat of the locating pin is keyed or synchronized to its octagon portion.
Figure 12:
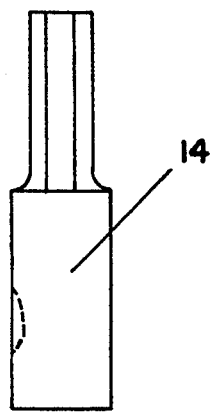
FIG. 12 is an enlarged right side view of the locating pin showing further detail of its ball-lock seat.

In use the locating pin 14 is then placed into the die button body-receiving hole of the die button retainer 12 and locked into place by the ball-lock seat on the locating pin 14, FIG. 11. FIG. 1 shows the locating pin 14 placed into the octagon shaped hole of the locating pin holder 13 which has been placed against the edges of gage blocks 15, 16 and 17 which in turn have been placed against the reference surfaces of the movable centerline reference block 6 and the reference plate 4.

After the die button retainer 12 has been positioned correctly, a transfer punch is used to transfer its counterbored bolt holes 30 and 31 to the face of the die shoe 20. The die shoe is then drilled and tapped using the transferred punch marks on the face of the die shoe 20. After drilling and tapping the die button retainer 12 is relocated by the above method and securely bolted into place. After bolting in place the dowel-receiving holes 32 and 33 are drilled and reamed using holes in retainer to guide the drill and reamer. Dowels are then inserted into both the die button retainer 12 and the die shoe 20, as illustrated in FIG. 9, which prevents lateral movement between the pieces.

In addition to positioning die blocks and die button retainers on die shoes, my invention can be used to set punch blocks and punch retainers on the punch shoe of die sets, without the necessity of assembling the die shoe and punch shoe together or without the necessity of machining any additional plates or fixtures for individual punches or punch retainers.

Figure 13:
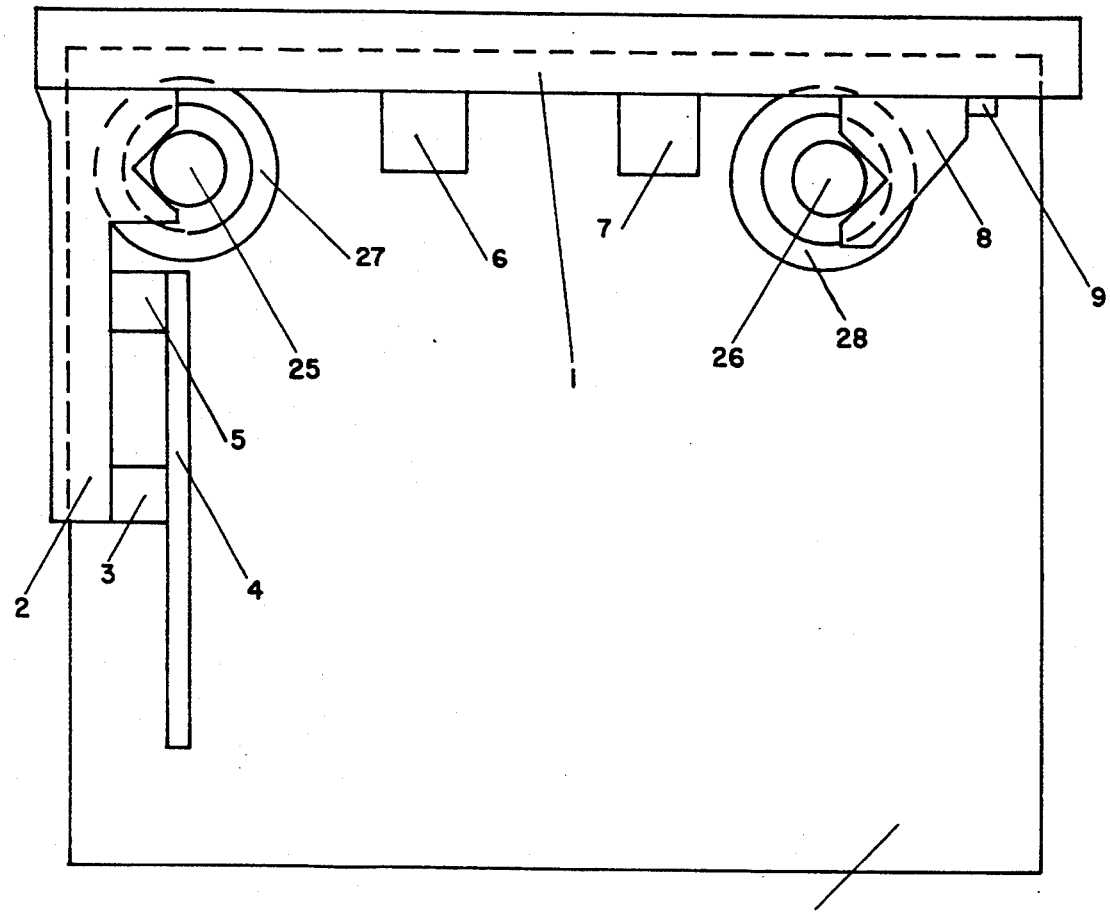
FIG. 13 is a top plan view of a punch shoe, it shows guide posts inserted into its bushings and the parallel and perpendicular reference rail assembly portion of my invention locked on to the inserted guide posts.
Figure 14:
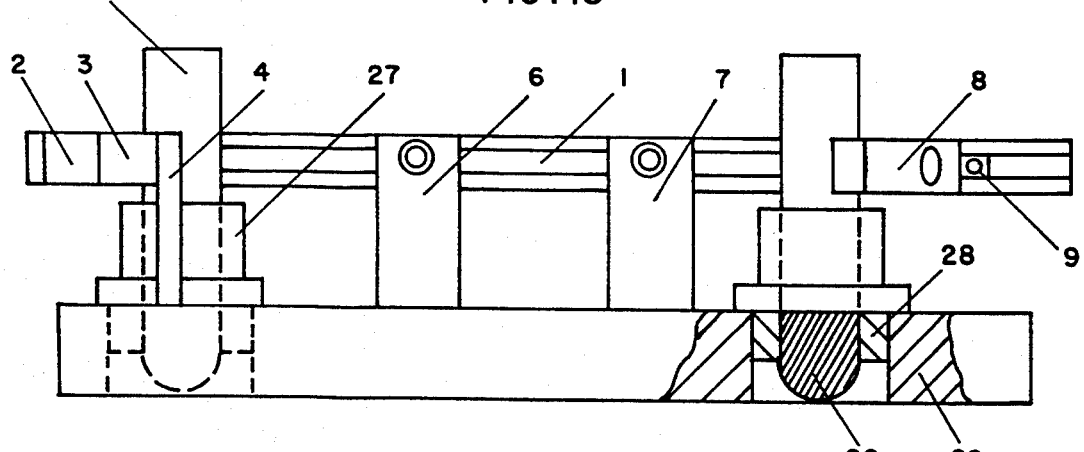
FIG. 14 is a front view of FIG. 13.

FIGS. 13 and 14 show a punch shoe 29 with a set of guide posts 25 and 26 inserted into its bushings 27 and 28, they also show the parallel and perpendicular reference rail assembly portion of my invention positioned and locked on to the inserted guide posts 25 and 26. The figures further show the parallel and reference surface of the reference plate 4 and the centerline reference blocks 6 and 7, which are used for positioning punch blocks or punch retainers on punch shoes of die sets.

FIG. 13 shows the spacers 3 and 5, and the reference plate 4 positioned on the arm portion of the compound stationary V-block and perpendicular reference arm 2, so as to clear the bushings 27 and 28.

After guide pins have been inserted into the bushings of punch shoes, my invention can be used to set punch blocks or punch retainers on those shoes by the exact same method as is used to align and set die blocks or die button retainers, as described herein, without machining any additional individual plates or fixtures or without the necessity of having the die shoe and the punch shoe assembled together.

It is apparent from the foregoing that there is provided a new and novel method of aligning punch and die blocks and punch and die retainers with great accuracy which results in a considerable saving in time involved in setting up a die set including custom punch and die retainers.

A new and novel parallel and perpendicular reference means is provided which is simple and inexpensive in construction and yet which is efficient and reliable in use and provides reference surfaces for aligning both punch and die blocks, with referenced edges, to correspond to the centerlines of guide posts and bushings of die shoes and punch shoes of die sets. The parallel and perpendicular reference means is provided with a new and novel compound force vector means which insures sufficient tightening providing great accuracy and locational repeatability. The parallel and perpendicular reference means provides reference surfaces for a new and novel punch and die button locating means which enables punch and die retainers, with reference punch and die button body-receiving holes, to be positioned to correspond to centerlines of guide posts and bushings of die shoes and punch shoes of die sets.

It is apparent that the construction permits very simple and ready positioning of punch and die blocks or punch and die button retainers relative to the associated supporting surfaces and that the structure can be used on both the punch shoe and die shoe of die sets, without the necessity of having the shoes assembled together or without machining individual fixtures or additional tooling plates.

As this invention may be embodied in several forms without departing from the spirit of essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A parallel and perpendicular reference rail assembly comprising:
    (a) a rail and means on said rail for keying and affixing attachments thereto;
    (b) a compound stationary V-block and perpendicular reference arm, means on said compound stationary V-block and perpendicular reference arm providing permanent fastening to said rail, means on said compound stationary V-block and perpendicular reference arm providing a nesting surface for the sides of cylindrical objects, means on said compound stationary V-block and perpendicular reference arm providing affixing attachments thereto;
    (c) a reference plate and means on said reference plate providing variable positioning along said arm portion of said compound stationary V-block and perpendicular reference arm;
    (d) spacers and means on said spacers providing mounting between said compound stationary V-block and perpendicular reference arm and said reference plate;
    (e) a movable V-block and means on said movable V-block providing variable positioning along the length of said rail, acute angular screw receiving means on said movable V-block providing compound force vectors between it and said rail, means on said movable V-block providing a nesting surface for the sides of cylindrical objects, a compound first T-nut connected to said movable V-block by a screw which extends through said acute angular screw receiving means, said compound first T-nut providing variable positioning of said movable V-block along the length of said rail;
    (f) centerline reference blocks and a plurality of second T-nuts attached to said reference blocks by screws for providing variable positioning of said centerline reference blocks along the length of said rail.

2. A parallel and perpendicular reference rail assembly as claimed in claims 1, wherein said compound first T-nut further comprises an elongated body of T-shaped cross section and set screw means on one end of the said elongated body, centered and perpendicular to said elongated body, providing locking of said compound T-nut in variable positions along the length of said rail.

* * * * *